US007853742B2

(12) United States Patent
Rothman et al.

(10) Patent No.: US 7,853,742 B2
(45) Date of Patent: Dec. 14, 2010

(54) SYSTEM AND METHOD TO CONDITIONALLY SHRINK AN EXECUTABLE MODULE

(75) Inventors: Michael A. Rothman, Puyallup, WA (US); Vincent J. Zimmer, Federal Way, WA (US); Greg P. McGrath, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1131 days.

(21) Appl. No.: 10/832,789

(22) Filed: Apr. 26, 2004

(65) Prior Publication Data

US 2005/0251583 A1    Nov. 10, 2005

(51) Int. Cl.
G06F 13/12 (2006.01)
G06F 15/16 (2006.01)
(52) U.S. Cl. .................. 710/68; 709/247; 717/136; 717/137; 717/140; 717/147; 717/148; 717/151; 717/159
(58) Field of Classification Search .......... 710/68; 709/247; 715/732; 365/200
See application file for complete search history.

(56) References Cited

U.S. PATENT DOCUMENTS

| | | | | |
|---|---|---|---|---|
| 4,389,706 A | * | 6/1983 | Gomola et al. ............... 700/1 |
| 5,113,494 A | * | 5/1992 | Menendez et al. .......... 345/502 |
| 5,335,328 A | * | 8/1994 | Dunn et al. ................. 710/33 |
| 5,481,701 A | * | 1/1996 | Chambers, IV ............. 707/101 |
| 5,841,979 A | * | 11/1998 | Schulhof et al. ............ 709/237 |
| 5,889,961 A | * | 3/1999 | Dobbek ...................... 709/247 |
| 5,923,878 A | * | 7/1999 | Marsland ................... 717/139 |
| 6,032,197 A | * | 2/2000 | Birdwell et al. ............. 709/247 |
| 6,272,252 B1 | * | 8/2001 | Eldridge et al. ............ 382/232 |
| 6,308,182 B1 | * | 10/2001 | Nishigaya et al. ........ 707/103 R |
| 6,385,567 B1 | * | 5/2002 | Lew et al. ..................... 703/27 |
| 6,654,954 B1 | * | 11/2003 | Hicks .......................... 717/162 |

(Continued)

FOREIGN PATENT DOCUMENTS

JP    03-201082    9/1991

(Continued)

OTHER PUBLICATIONS

'Knowledgerush—Bitmask' from http://knowledgerush.com/kr/encyclopedia/Bitmask, copyright 1999—2003.*

(Continued)

*Primary Examiner*—Henry W Tsai
*Assistant Examiner*—Steven G Snyder
(74) *Attorney, Agent, or Firm*—Grossman, Tucker, Perreault & Pfleger, PLLC (57) ABSTRACT

An embodiment of the present invention is a system and method relating to shrinking, or optimizing, executable images resulting is a savings of storage space. In at least one embodiment, the present invention removes unnecessary fields, or information, from an executable image header before storing the image on a flash for a target platform. The removal of information that is irrelevant to the target platform allows the executable to take up less space on the flash memory. When loaded, the image is interpreted based on the optimized header information. In an embodiment, the image may be further compressed by known methods, to save additional space. Other embodiments are described and claimed.

13 Claims, 5 Drawing Sheets

U.S. PATENT DOCUMENTS

| | | | | |
|---|---|---|---|---|
| 6,678,770 | B1* | 1/2004 | Sutoh | 710/110 |
| 6,715,142 | B1 | 3/2004 | Saito et al. | |
| 6,845,130 | B1* | 1/2005 | Han et al. | 375/240.16 |
| 7,197,711 | B1* | 3/2007 | Crosbie et al. | 715/732 |
| 2001/0008023 | A1* | 7/2001 | Bond et al. | 717/8 |
| 2002/0034105 | A1* | 3/2002 | Kulkarni et al. | 365/200 |
| 2002/0069342 | A1 | 6/2002 | Ginsberg | 711/209 |
| 2003/0009747 | A1* | 1/2003 | Duran | 717/137 |
| 2003/0018825 | A1* | 1/2003 | Johnson et al. | 709/310 |
| 2003/0223491 | A1* | 12/2003 | Wreschner et al. | 375/240 |
| 2004/0088701 | A1* | 5/2004 | Hatalkar | 718/100 |
| 2004/0226004 | A1* | 11/2004 | Oldman | 717/136 |
| 2005/0132356 | A1* | 6/2005 | Cross et al. | 717/174 |
| 2008/0059781 | A1* | 3/2008 | Li et al. | 713/1 |

FOREIGN PATENT DOCUMENTS

| | | |
|---|---|---|
| JP | 2000-076077 | 3/2000 |
| JP | 2001-077953 | 3/2001 |
| JP | 2001-166941 | 6/2001 |
| JP | 2001-175466 | 6/2001 |
| JP | 2002-108801 | 4/2002 |
| JP | 2003-008644 | 1/2003 |
| JP | 2003-186635 | 7/2003 |
| JP | 2004-180030 | 6/2004 |
| JP | 2005-020595 | 1/2005 |
| JP | 2005-182790 | 7/2005 |
| WO | 02/41638 A2 | 5/2002 |
| WO | 2005/109848 A2 | 11/2005 |

OTHER PUBLICATIONS

'How to detect the types of executable files' (3 parts) by Peter Johnson, posted at www.delphidabbler.com on Aug. 29, 2003.*

'Byte Alignment and Ordering' from www.eventhelix.com, version published on Apr. 7, 2003, copyright EventHelix.com Inc.*

European Patent Office, International Search Report and Written Opinion for International Application No. PCT/US2005/012128, 14 pages, Dec. 12, 2005.

Ali-Reza Adl-Tabatabai et al., "Improving 64-Bit Java IPF Performance by Compressing Heap References," Proceedings of the International Symposium on Code Generation and Optimization, pp. 100-110, Mar. 2004.

C. Scott Ananian et al., "Data Size Optimizations for Java Programs," Proceedings of the ACM SIGPLAN Conference on Language, Compiler, and Tool Support for Embedded Systems, pp. 59-68, Jun. 2003.

David F. Bacon, et al., "Space-and Time-Efficient Implementation of the Java Object Model," Proceedings of the 16$^{th}$ European Conference on Object Oriented Programming, pp. 111-132, Jun. 2002.

Office Action for Japenese Patent Application No. 2007-509506, Mailed on Nov. 24, 2009, 5 pages of Office Action and English translation of 5 pages.

International Preliminary Report on Patentability for PCT Patent Application No. PCT/US2005/012128, mailed on Nov. 9, 2006, 9 pages.

Office Action for Chinese Patent Application No. 200580013217.5, Mailed on Aug. 28, 2009, 4 pages of Office Action and English translation of 5 pages.

Office Action for Chinese Patent Application No. 200580013217.5, Mailed on Aug. 24, 2007.

Office Action for Chinese Patent Application No. 200580013217.5, Mailed on May 8, 2009, 5 pages of Office Action and English translation of 6 pages.

Notice of Allowance for Chinese Patent Application No. 200580013217.5, Mailed on Jan. 15, 2010, 2 pages of Notice of Allowance and English translation of 2 pages.

Office Action for European Patent Application No. 05733781.8 Mailed on Mar. 6, 2008, pp. 6.

Office Action for Japanese Patent Application No. 2007-509506, mailed on May 11, 2010, 3 pages of Office Action and English translation of 3 pages.

Office Action for Japanese Patent Application No. 2007-509506, mailed on Nov. 4, 2008, 2 pages of Office Action and English translation of 1 page.

Office Action for Japanese Patent Application No. 2007-509506, mailed on Jun. 16, 2009, 14 pages of Office Action and English translation of 5 pages.

Microsoft Corporation, "Microsoft Portable Executable and Common Object File Format Specification", Feb. 1999, Revision 6.0, 73 Pages.

Notice of Allowance received for Japanese Patent Application No. 2007-509506, mailed on Sep. 7, 2010, 2 pages of Notice of Allowance and Partial English translation of 1 page.

* cited by examiner

SYSTEM AND METHOD TO CONDITIONALLY SHRINK AN EXECUTABLE MODULE

FIELD OF THE INVENTION

An embodiment of the present invention relates generally to formatting code image files and, more specifically, to shortening the length (shrinking) of code image files to be stored in flash memory by omitting unnecessary fields in common headers before storing the image in the flash memory.

BACKGROUND INFORMATION

Various mechanisms exist for formatting and compressing binary code images for storing in a storage device. In this context, a binary code image is typically an executable image, or any image that is executed, for example on a personal computer (PC), or in firmware, etc., or on any processing system where a computer program is used to accomplish some task. Any image that is to be executed on a processor must have a standard format so that the target processor firmware can recognize that the image may be executed from flash memory, or loaded into memory or executed in another manner. A common standard used in existing PC systems to be used for executable images is the portable executable, common object file format (PE/COFF) specification, entitled, *Microsoft Portable Executable and Common Object File Format Specification, Revision* 6.0, Microsoft Corporation, February 1999, and may be found on the World Wide Web at http://www.microsoft.com/whdc/hwdev/hardware/PE-COFF.mspx. This format is portable because the formatted file is meant to be executed on different targets. For instance a PE/COFF image might be executed in both a WIN/CE environment, as well as, a Windows® XP environment. As long as the target processor recognizes a PE/COFF format, the processor can execute the PE/COFF formatted image.

To execute on different platforms, the PE/COFF image must contain specific information related to possible target platform and operating systems. Thus, there may be information in the PE/COFF image that is not relevant to every possible target platform. Not all fields will be applicable to all platforms.

For instance, the PE/COFF image may be a device driver. The device driver may reside in flash memory. It is desirable to reduce the size of the device driver in flash memory to save valuable space on this storage device. In existing systems, space saving techniques are often limited to compression of the image content. In some cases, the entire image file, including headers is compressed.

A device driver image is typically developed to be available on multiple computing platforms. Having one executable reduces configuration and development/maintenance costs for the vendor. The header of the image may indicate that different modules or routines are applicable for different platforms, perhaps by including a pointer or virtual address. Some executables must be executed from a real address in flash memory. These executables are called XIP (eXecute In Place), and cannot be relocated, for example. Other executables may be relocated to memory. This information may be included in the PE/COFF image itself.

In existing systems, a PE/COFF image is delivered to multiple platforms and loaded into flash memory on the target platform. If the image is of the type XIP, the image cannot be compressed on the flash memory, because the image must be executed from the flash memory. Therefore, the information residing on the flash memory must be directly executable instructions. Other images may be compressed before loading into flash memory. There are a variety of methods known in the art to compress executable images before writing to a flash memory.

BRIEF DESCRIPTION OF THE DRAWINGS

The features and advantages of the present invention will become apparent from the following detailed description of the present invention in which.

DETAILED DESCRIPTION

An embodiment of the present invention comprises a system and method for relating to shrinking, or optimizing, executable images resulting is a savings of storage space. In at least one embodiment, the present invention is intended to remove unnecessary fields, or information, from an executable image header before storing in flash memory for a target platform. The removal of information irrelevant to the target platform allows the executable to take up less space in the flash memory. When loaded, the image is interpreted based on the optimized header information. In an embodiment, the image may be further compressed by known methods, to save additional space.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

There are a variety of methods for reducing the size of executable images. For illustration and the purpose of simplicity, embodiments below are described in the context of a PE/COFF image. It will be apparent to one of ordinary skill in the art that the system and methods described herein may be used for other image formats, for instance, an ELF image, or Mach-O formatted image. ELF (Executable and Linking Format) may be used for the Linux operating system and was originally developed by Unix System Laboratories. More information on ELF may be found in the Linux MANual Reference Pages, http://www.gsp.com/cgi-bin/man.cgi?section=5&topic=elf. The Mach-O format is used by Apple Computer operating systems. More information on this format may be found, as described in *Mach-O Runtime Architecture*, Apple Computer Inc., Aug. 7, 2003. (Chapter 3—Mach-O File Format Reference) (see http://developer.apple.com/documentation/DeveloperTools/Conceptual/MachORuntime/).

An embodiment of the present system and method effectively prunes an executable image, thereby enabling the image size to be reduced (or shrunk). An embodiment of this invention differs from compression in that a compressed item may be reconstituted to an original state. A shrunk executable is reduced in a customized fashion and some data (or fields) that are irrelevant to the target platform may be discarded. After pruning, the image may be further compressed using known methods.

An embodiment of the invention may remove content from an executable image prior to loading the image on the flash memory. Irrelevant data may be removed and an applicable subset of the image is defined as standard for the target platform. The defined subset is used to compress and load the image. This may result in a smaller image, thus, saving space on the storage device. Embodiments of the disclosed system and method may be additive to existing compression technologies. Further, the disclosed system and method may be applied to images that are already compressed.

Figure 1:
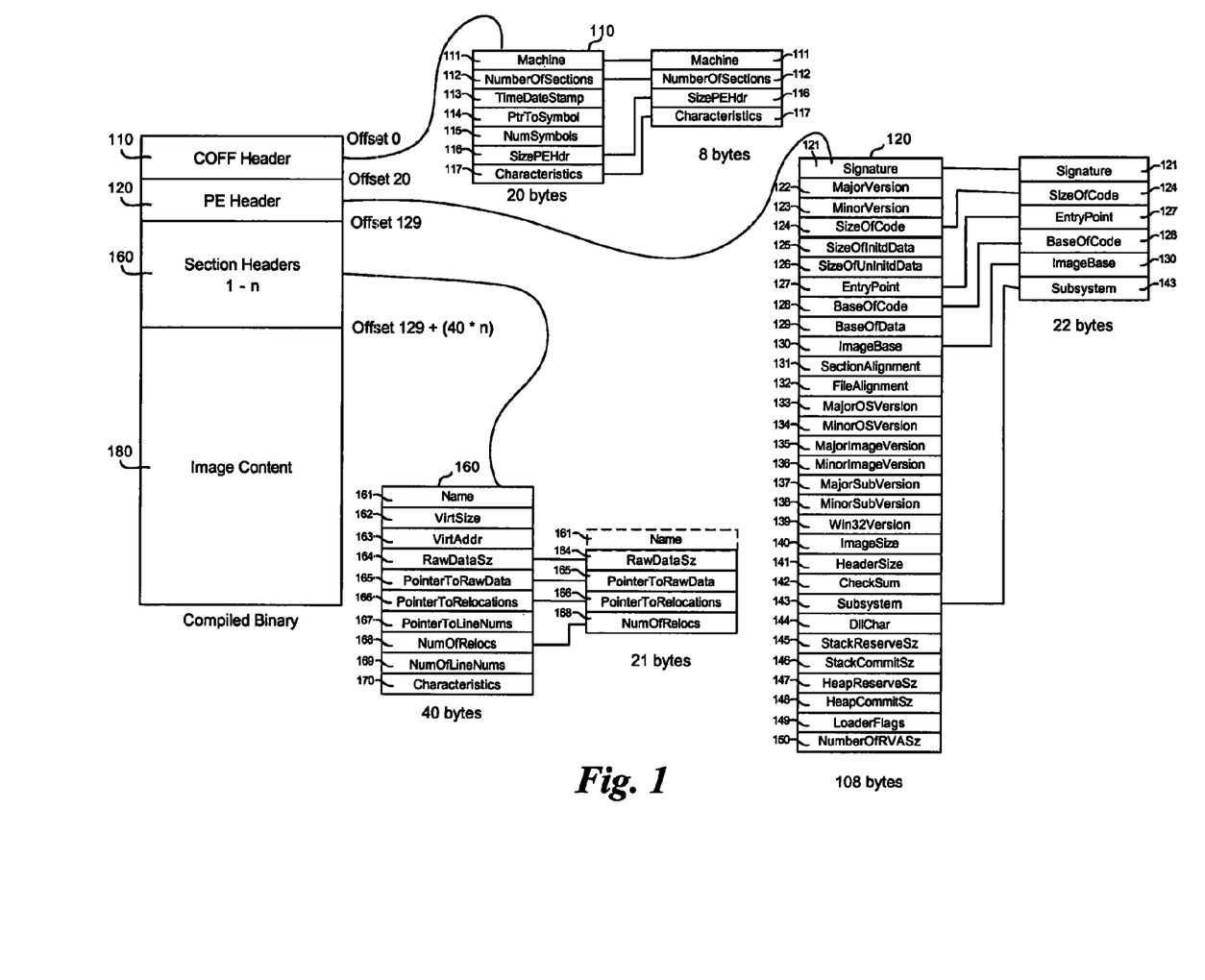
FIG. 1 is a block diagram representing a PE/COFF image and illustrating an exemplary method to shrink the image headers, according to an embodiment of the invention.

Referring now to the drawings, and in particular to FIG. 1, a PE/COFF image is shown. The PE/COFF image comprises a COFF header 110, a PE header 120, section headers 160, and image content 180. In one embodiment, the COFF header 110 may comprise seven fields (20 bytes): machine 111, NumberofSections 112, TimeDateStamp 113, PtrToSymbol 114, NumSymbols 115, SizePEHdr 116 and Characteristics 117. Table 1, below, illustrates the offsets and length of each field in the COFF header, according to the PE/COFF Specification. Of these 20 bytes, the target platform may need access only to fields: machine 111, NumberofSections 112, SizePEHdr 116 and Characteristics 117, using only eight bytes. The address offset for the end of the PE header 120 may be determined by the value in the COFF header 110 which specifies the size of the PE header, i.e., SizePEHdr 116 at offset 16. The size of the section headers 160 may be determined by multiplying the number of sections, which may be a 16-bit value in offset 2 of the COFF header (i.e., NumberofSections 112) by the length of the sections. In example, the default sections are 40 bytes long.

TABLE 1

COFF Header Field Offsets

| Offset | Size | Field |
| --- | --- | --- |
| 0 | 2 | Machine |
| 2 | 2 | NumberOfSections |
| 4 | 4 | TimeDateStamp |
| 8 | 4 | PointerToSymbolTable |
| 12 | 4 | NumberOfSymbols |
| 16 | 2 | SizeOfOptionalHeader |
| 18 | 2 | Characteristics |

In this example, the PE header 120 comprises fields: Signature 121, MajorVersion 122, MinorVersion 123, SizeOfCode 124, SizeOfInitdData 125, SizeOfUnInitdData 126, EntryPoint 127, BaseOfCode 128, BaseOfData 129, ImageBase 130, SectionAlignment 131, FileAlignment 132, MajorOSVersion 133, MinorOSVersion 134, MajorImageVersion 135, MinorImageVersion 136, MajorSubVersion 137, MinorSubVersion 138, Win32Version 139, ImageSize 140, HeaderSize 141, CheckSum 142, Subsystem 143, DllChar 144, StackReserveSz 145, StackCommitSz 146, HeapReserveSz 147, HeapCommitSz 148, LoaderFlags 149, and NumberOfRVASz 150. In this example, the PE header 120 comprises 108 bytes. For some platforms, only 22 bytes of the PE header 120 are needed: Signature 121, SizeOfCode 124, EntryPoint 127, BaseOfCode 128, ImageBase 130 and Subsystem 143. Thus, the PE header may be reduced by 86 bytes to 22 bytes.

In this example, the section headers 160 comprise multiple sets (one for each section) of fields: Name 161, Virtsize 162, VirAddr 163, RawDataSz 164, PointertoRawData 165, PointertoRelocations 166, PointertoLineNums 167, NumofRelocs 168, NumofLineNums 169, and Characteristics 170 (total of 40 bytes). For some platforms, only the fields: Name 161, RawDataSz 164, PointertoRawData 165, PointertoRelocations 166, and NumofRelocs 168 are used for a total of 21 bytes. The name field may be pre-allocated to allow for 32 sections, i.e., one overhead byte and 32-bits of data. Thus, eliminating the unused fields may save 19 bytes per section.

In one embodiment, the first section header will always have a Name field. In many cases, the first section shows the first byte to be a 0 value (normally invalid) and the remaining four bytes will be a 32-bit mask of which sections are optimized/shrunk versus which ones are not. However, it is possible that the first section is not optimized. In this case, the first section will not have the first byte as a 0. In other words, the Name field will be conformant to the PE/COFF specification and be an eight byte field with some actual name in it. In this situation, the next section header that is optimized will be an indicator of the status of the remaining sections and that next section header will have a name field (five bytes). In the case that the first n section headers are not optimized, then the n+1 section header will have the bit mask in the Name field. Once the mask appears in a section header Name field, it is no longer necessary to have Name fields in subsequent optimized section headers. Some embodiments may use the Name field in all section headers, to be consistent. One should note that in the present discussion, the bytes used, and fields required, are used for illustration only. Other systems may use a different format for the header, or require different fields.

Figure 2:
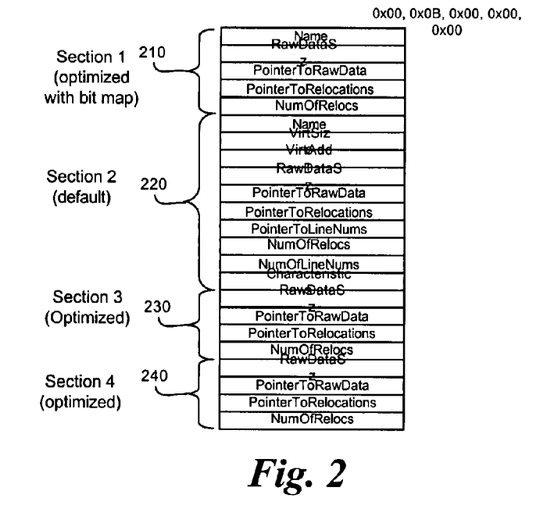
FIG. 2 is a block diagram representing a partially shrunk, or optimized, PE/COFF section header, according to an embodiment of the invention.

FIG. 2 shows an illustration of a PE/COFF section header reduced to exclude the unneeded fields in an image having four sections 210, 220, 230 and 240. In this example, section headers 1, 3 and 4 (210, 230 and 240) are optimized, or shrunk. Section header 2 uses the default fields, as defined by the format standard. As may be seen in FIG. 2, section 1 (210) comprises a Name field 161, but sections 3 and 4 (230, 240) do not. Each of the optimized section headers further comprises four fields 164, 165, 166, and 168, as shown in FIG. 1. The Name field 161 has special significance as will be described more fully, below.

Figure 3:
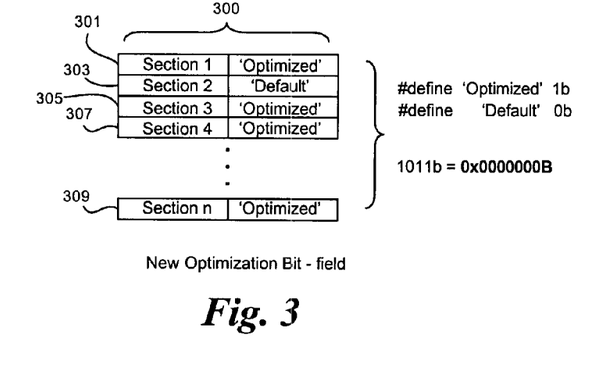
FIG. 3 shows a table indicating whether section headers of FIG. 2 are in their default form, or optimized.

In one embodiment, the Name field 161 is used in the first section header 210 to identify which section headers are optimized, and which section headers use the full default format. FIG. 3 shows a table 300 which defines whether following sections are optimized, or pruned, or are using the default format. For instance, in one example, the image has n sections, 1–n. The first section 301 is optimized. The second section 303 uses the default format. The third and fourth sections (305, 307) are optimized, and so on to the nth section 309 which is optimized. In some embodiments, this table may be implemented in a mask word, where a 1-bit (1b) indicates that the section is optimized and a 0-bit (0b) indicates that the section uses a default format. This mask, or header, may be pre-pended to the image file, or located at another predetermined offset (known) in the image, for instance overload an unused field in the image, i.e., the Name field 161. In this example, sections 1-4, as shown in FIG. 3, are represented by 1011b, where the least significant bit is used for the first section 301.

The term "optimize" has a specific meaning dependent on the platform to which the image will be loaded. There may be an agent, or reconstructor, that processes the images and then loads them into memory. The agent interprets the sections based on this bit mask. Thus, if a section is optimized, the agent will know how many bytes and which fields are used in the sections. In an embodiment, the Name field 161 of Section 1 (301) is used to store the table of FIG. 3, as a bit map. This allows an agent to identify default and optimized sections without adding additional overhead to the image file. For instance, a Name field 161 that begins with a zero byte may be interpreted as a Name field that has been used to store the optimization table. If the first byte is non-zero, then the agent reads the image in as in the default/legacy format.

In existing systems, there are not often more than 16 sections in a PE/COFF image. Thus, in an embodiment which uses the Name field 161 to hold the optimization table, only two bytes are needed to convey the mask information. A Name field is defined as 8 bytes in the PE/COFF specification. In an embodiment, four bytes are reserved for the table to allow for up to 32 sections. Thus, only five bytes are used for the Name field. In one implementation, the first byte is a flag indicating whether this field is used as a table, four bytes are used in the table and the remaining three bytes of the Name field may be used for other purposes, or are omitted.

Figure 4:
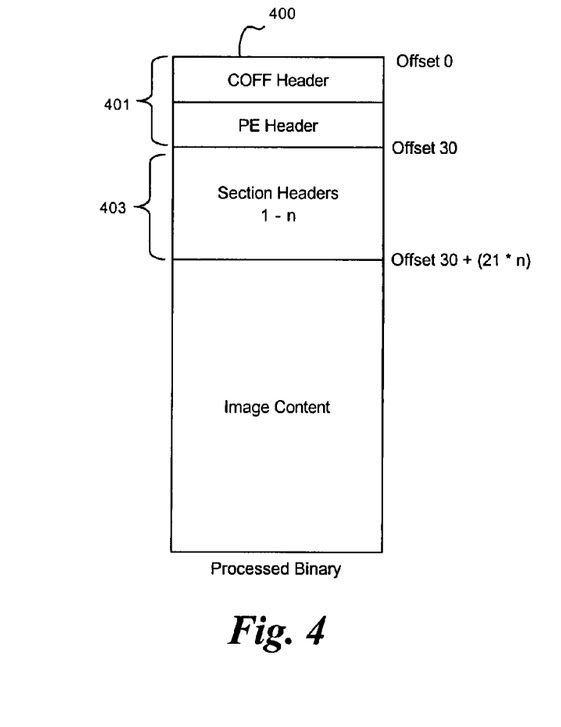
FIGS. 4 and 5 illustrate space saved using an embodiment of the invention.

Referring now to FIG. 4, there is shown a representation of a processed PE/COFF image 400. In one example, the PE/COFF header is reduced to 30 bytes (401) from 129 bytes (see FIG. 1), and the section header area 403 is reduced to 21*n bytes, where n is the number of sections, from 40*n bytes. While the savings may not seem significant on the surface, a flash memory may comprise many images. If the space savings is available for many of the images to be loaded on the flash memory, then more space is available for additional images, or the flash card may be reduced in size. Space savings may vary by target platform, as each platform may require a different set of fields. Space savings for image formats other than PE/COFF, for instance ELF and Mach-O, will also vary by format and target platform.

Figure 5:
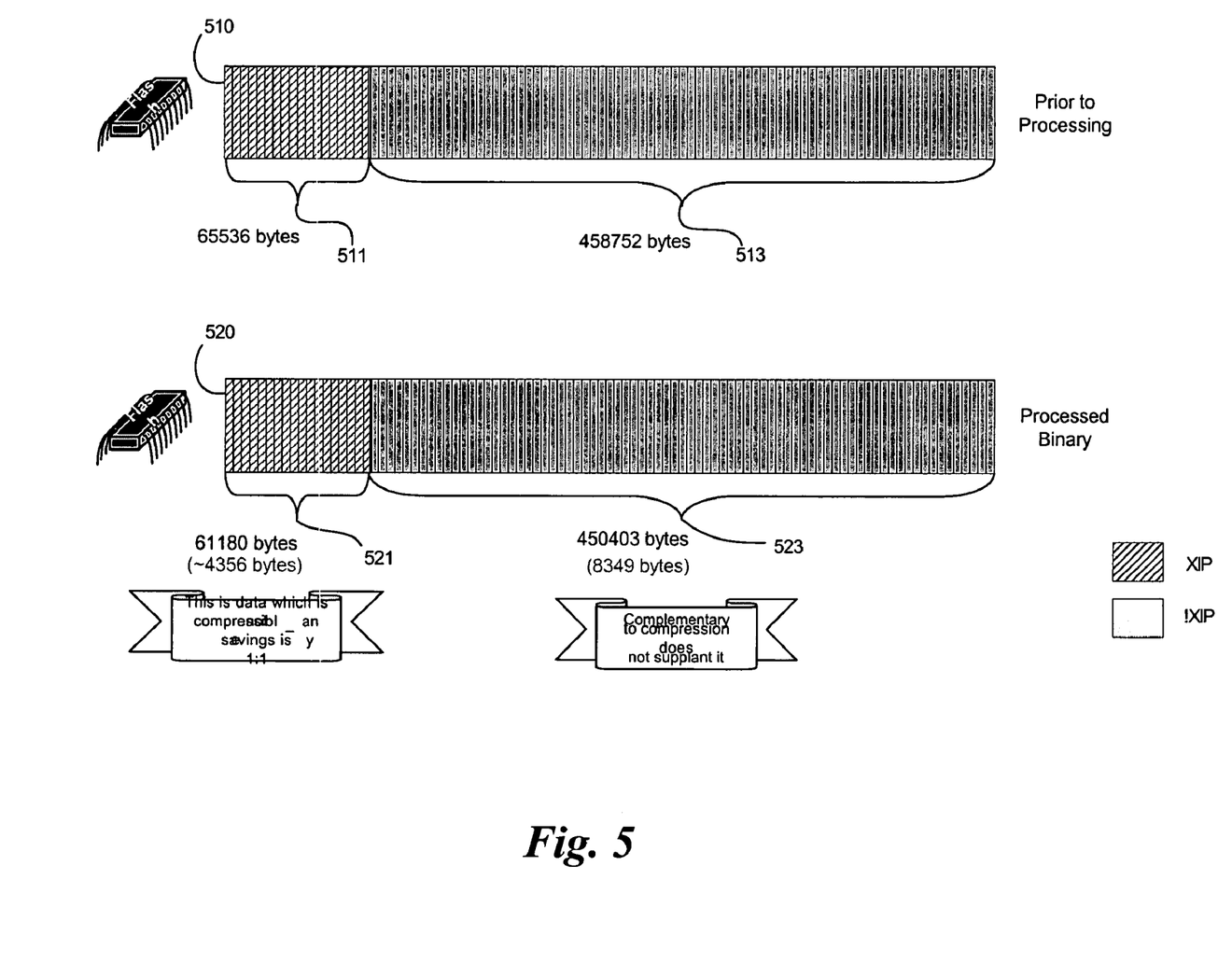

FIG. 5 is representation of flash memory showing space savings using an embodiment of the disclosed system and method. According to one example, an entire flash image is shown prior to processing 510 and post-processing 520. The flash image without processing 510 may comprise 65536 bytes 511 dedicated to XIP code and 458752 bytes 513 dedicated to non-XIP code. In the processed image on flash memory, the XIP image is not compressed, but the XIP image still may be pruneable according to an embodiment of the present invention. Thus, traditional methods would require 65536 bytes for this area of the image, but a pruned, or optimized, XIP area may only require 61180 bytes 521. Similarly, in this example, non-XIP code may require 458752 bytes 513 using the traditional format, but after pruning, requires only 450403 bytes 523. It should be noted that XIP code may not be compressed, so in traditional methods, no space savings is possible.

Figure 6:
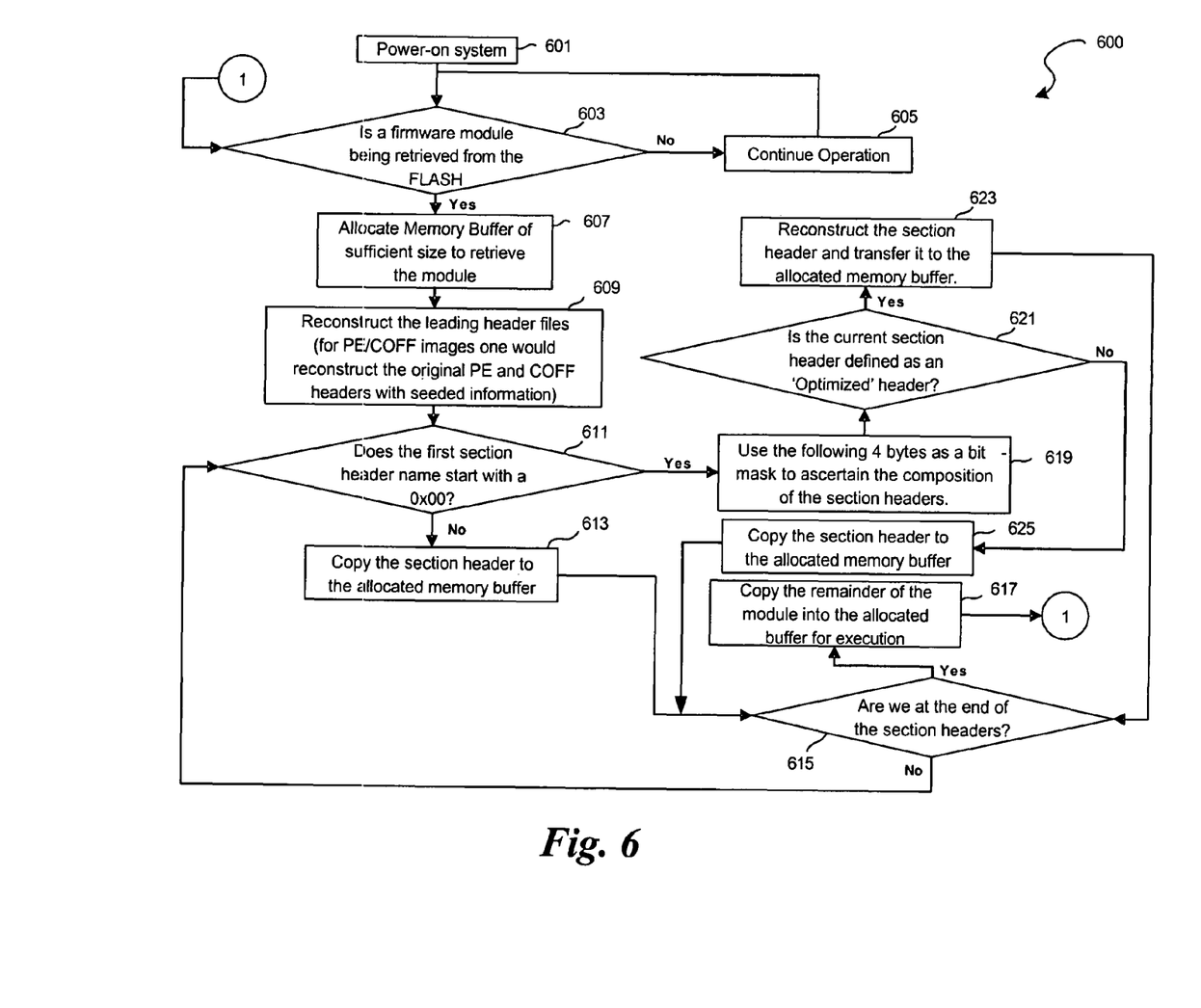
FIG. 6 is a flow diagram showing an exemplary method for using a shrunk, or optimized, PE/COFF image, according to an embodiment of the invention.

Referring now to FIG. 6, there is shown a flow chart illustrating an exemplary method 600 for loading a processed, or pruned, image, according to an embodiment of the invention. Executable images may be loaded from flash memory upon boot or system power-on (block 601). A determination is made as to whether a firmware module is to be retrieved from flash memory, in block 603. If no module is to be retrieved, the processing continues at block 605 with normal operation until it must be determined whether a firmware module is to be retrieved from flash memory in block 603.

If a firmware module is to be retrieved from flash memory, then a memory buffer of sufficient size is allocated in block 607, for storing the image/module. The size of the image is stored in the image, and if there has been no pruning, the size is stored in the PE header. The size of the image is determined from the PE header, for non-pruned images, or calculated from the default and optimized information. The leading header files are reconstructed in block 609. For an exemplary PE/COFF image, the original PE and COFF headers are reconstructed with seeded information to fill in the gaps of pruned information. In other words, headers of the original size are reconstructed so when the image is in memory, the image takes the same space as it would have if the data had never been pruned. This is so legacy software can read the image. In some embodiments, the PE/COFF (or other format) headers are pruned, but the section header data is only partially pruned or not at all.

In one embodiment, the first section header overloads the Name field with the optimization (pruning) mask. It is determined whether the images have been pruned in block 611. In this example, this determination looks at the Name field of the first section. If the first byte is zero, then the image has been pruned and the mask is within the Name field. If the first byte of the Name field is non-zero, then the image is in the default format and may be loaded in the traditional manner, one section at a time. If the image file has not been pruned, then the first section header is copied to the allocated memory buffer in block 613. If there are more section headers to load, as determined in block 615, then processing continues with block 611 and the next section header is copied to memory in block 613. It will be apparent to one of ordinary skill in the art that the determination made in block 611 may need to be done only once, and then a flag may be set for looping through the section headers. The loop (611, 613, 615) in flow chart 600 is illustrative only and may be implemented in a variety of ways.

If the image has been pruned, as indicated in block 611, then in one embodiment, the following four bytes are used as a bit mask to determine whether each header is in the optimized or default format, in block 619. It is determined whether the current section header is defined as an optimized header, as identified in the bit mask, in block 621. If not, then the section header is copied to the allocated memory in block 625, and processing continues with the next section header.

If the section header has been optimized, or pruned, then the header must be reconstructed. In order to be compatible with legacy programs which expect the full image format, the section header is reconstructed in block 623. The fields remaining are moved to the location corresponding to offsets defined in the image format, such as PE/COFF. Pruned, or deleted/omitted, fields are filled with seed data or left blank and copied to the offset location of that field in the original file format. Thus, the reconstructed section header will appear to be in the default format to be compatible with legacy software. The seeded fields (previously pruned) are by definition unnecessary for the target platform and any data in these fields is ignored. Processing continues until all section headers have been copied to the allocated memory.

Once all section headers have been loaded to memory, the remainder of the image file is loaded into memory in block 617. Processing continues at block 603 to load any additional image files that may be present.

If the image is XIP, then the image may not be not loaded into main memory, but must be executed directly from the flash memory. Normally XIP files will execute from the flash memory and no compatibility is strictly needed since these files are typically not particularly portable. More often than not, they are used very early in system initialization and not referenced once the platform has evolved into a more resource-rich state, i.e., when memory is discovered and used. How XIP images are handled is implementation specific.

Figure 7:
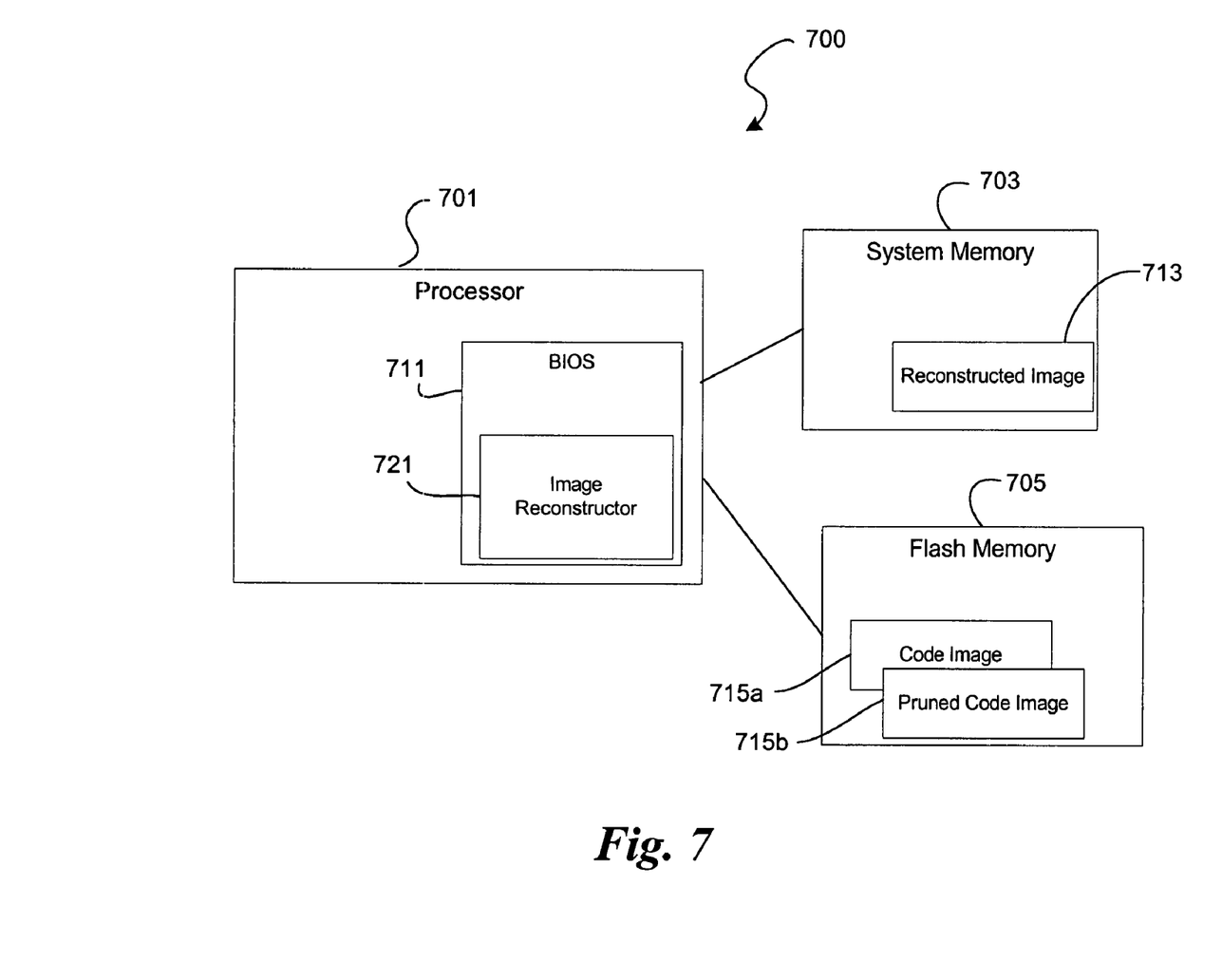
FIG. 7 is a block diagram showing an exemplary system for reconstructing pruned code image files, according to an embodiment of the invention.

Referring now to FIG. 7, there is shown an exemplary system 700 for reconstructing pruned code image files. In one embodiment, a processor 701 has a system memory 703 and is operatively coupled to a flash memory 705. During pre-boot processing, a basic input/output system (BIOS) 711 executes in the processor 701. At various time during pre-boot it may be necessary to retrieve code image files 715 from flash memory. In an embodiment, one or more code image files 715 may reside in the flash memory 705. A code image file may be a pruned image file 715b, which has been pruned, or shrunk, according to a method as described above, or the code image file may be an original code image file 715a. The code image files 715 may be compressed, regardless of whether they are also pruned. In the case of a pruned code image 715b, the BIOS 711 transfers control to an image reconstructor 721 in order to reconstruct the headers of the pruned image 715b. The reconstructed code image 713, it is placed into system memory 703 in a form which can be processed by legacy code, where the legacy code does not necessarily know that the image was initially pruned. It is possible for legacy code to process the reconstructed image because any data that was pruned from the original image was unneeded by this target platform.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for loading an executable firmware image on a target platform during boot, comprising:
   allocating a memory buffer of sufficient size to hold an executable firmware image file;
   determining whether the executable firmware image file has been pruned by checking at least one mask field in the executable firmware image file, wherein pruning comprises discarding data from the executable firmware image file when the data is irrelevant to the target platform, and wherein the at least one mask field is a standard field in a firmware image header and is configured to be selectively used for both pruned and legacy unpruned firmware images based on a pre-determined bit of the mask field; and
   loading, by a firmware service during boot, the executable firmware image file into the memory buffer for execution, wherein, if the executable firmware image file is determined to have been pruned, the executable firmware image file is reconstructed upon loading but without the discarded data;
   wherein loading the executable firmware image file further comprises:
     loading a plurality of section headers into the memory buffer; and
     loading the image content into the memory buffer;
   wherein each of the plurality of section headers loaded into the memory buffer comprises one of a default format section header and a reconstructed section header.

2. The method as recited in claim 1, wherein loading the executable image firmware file further comprises:
   for each section header corresponding to the executable firmware image file,
   if the executable image firmware file has been pruned, then determining whether a current section header has been pruned, and if so, then reconstructing a current standard format section header from the pruned current section header, and loading the reconstructed section header into the memory buffer such that the executable firmware image file takes substantially the same space after reconstruction as the executable firmware image file would without pruning, but if the current section header has not been pruned, then loading the current section header into the memory buffer; and if the firmware image file has not been pruned, then loading each section header into the memory buffer.

3. The method as recited in claim 1, wherein determining whether the executable firmware image file has been pruned comprises:
retrieving a bit mask; and
identifying a plurality of section headers corresponding to the executable firmware image file and using the bit mask to determine whether each identified section header has been pruned.

4. The method as recited in claim 3, wherein the bit mask is located in a Name field of a first section header of the plurality of section headers corresponding to the executable firmware image file.

5. The method as recited in claim 1, wherein the executable firmware image content is identified as execute-in-place (XIP) code.

6. The method as recited in claim 1, wherein the image content is compressed.

7. The method as recited in claim 1, wherein the executable firmware image file is pruned in a first predetermined format for a first target platform and the executable firmware image file is pruned in a second predetermined format for a second target platform.

8. A machine accessible storage medium having instructions stored thereon for loading an executable firmware image file on a target platform during boot, the instructions when executed cause a machine to:
allocate a memory buffer of sufficient size to hold an executable firmware image file;
determine whether the executable firmware image file has been pruned by checking at least one mask field in the executable firmware image file, wherein pruning comprises discarding data from the executable firmware image file when the data is irrelevant to the target platform, and wherein the at least one mask field is a standard field in a firmware image header and is configured to be selectively used for both pruned and legacy unpruned firmware images based on a pre-determined bit of the mask field;
wherein the instructions to determine whether the executable firmware image file has been pruned further cause the machine to:
retrieve a bit mask; and
identify a plurality of section headers corresponding to the image file and use the bit mask to determine whether each identified section header has been pruned;
wherein the bit mask is located in a Name field of a first section header of the plurality of section headers corresponding to the executable firmware image file; and
load the executable firmware image file into the memory buffer for execution, wherein, if the executable firmware image file is determined to have been pruned, the executable firmware image file is reconstructed upon loading but without the discarded data.

9. The machine accessible storage medium as recited in claim 8, wherein the instructions for loading the executable firmware image file further cause the machine to:
for each section header corresponding to the executable firmware image file,
if the executable image firmware file has been pruned, then determine whether a current section header has been pruned, and if so, then reconstruct a current standard format section header from the pruned current section header, and load the reconstructed section header into the memory buffer such that the executable firmware image file takes substantially the same space after reconstruction as the executable firmware image file would without pruning, but if the current section header has not been pruned, then load the current section header into the memory buffer; and
if the firmware image file has not been pruned, then load each section header into the memory buffer.

10. The machine accessible storage medium as recited in claim 8, wherein the instructions to load the executable image file further cause the machine to:
load a plurality of section headers into the memory buffer; and
load the image content into the memory buffer.

11. The machine accessible storage medium as recited in claim 10, wherein each of the plurality of section headers loaded into the memory buffer comprises one of a default format section header and a reconstructed section header.

12. The machine accessible storage medium as recited in claim 10, wherein the image content is identified as execute-in-place (XIP) code.

13. The machine accessible storage medium as recited in claim 10, wherein the image content is compressed.

* * * * *